Aug. 30, 1955  W. G. HOELSCHER  2,716,675
ELECTRICAL FEED RAIL STRUCTURE FOR LATHES
Filed Jan. 26, 1950  2 Sheets-Sheet 1

INVENTOR
WILLIAM. G. HOELSCHER

BY Wood, Arey, Herron & Evans

ATTORNEYS.

Aug. 30, 1955

W. G. HOELSCHER 2,716,675

ELECTRICAL FEED RAIL STRUCTURE FOR LATHES

Filed Jan. 26, 1950

INVENTOR.

William G. Hoelscher

BY

Wood, Arey, Herron & Evans

ATTORNEYS.

United States Patent Office 2,716,675
Patented Aug. 30, 1955

2,716,675

ELECTRICAL FEED RAIL STRUCTURE FOR LATHES

William G. Hoelscher, Cincinnati, Ohio, assignor to American Tool Works, Cincinnati, Ohio, a corporation of Ohio Application January 26, 1950, Serial No. 140,608

2 Claims. (Cl. 191—23)

This invention relates to lathes and similar machine tools having a motor driven headstock, a translatable carriage, and mechanical driving apparatus for the carriage, and is directed particularly to the feed rail structure of an electrical control system providing rapid carriage traverse and control of the headstock motor from the carriage. The feed rail structure forms part of an electrical distributon system mounted upon the lathe bed and in electrical connection with lever operated switches mounted on the carriage; these switches, in turn, are an electrical connection with the headstock motor and with a rapid traverse motor, thus providing a centralized station at the carriage for control of both motors.

This application is a continuation in part of the co-pending application of William G. Hoelscher entitled, "Hand or Power Transmitting Apparatus," bearing Serial No. 48,955, filed September 13, 1948, now Patent No. 2,608,109, issued on August 26, 1952, relating generally to the mechanical-electrical carriage driving apparatus and its mechanical interlock system. The present application relates to the feed rail structure for establishing an electrical circuit from the bed to the carriage and from the carriage to the headstock motor and carriage motor.

In general, the lathe headstock includes a speed change transmission for driving the spindle at selected speeds by operation of gear shift levers and a feed box transmission connected with the headstock transmission also having speed change levers for regulating the longitudinal carriage feed rate in ratio with spindle speed. The drive is transmitted from the feed box to the carriage by the usual feed rod and lead screw extending along the bed. In setting up the machine, the spindle speed and carriage feed are selected in the customary fashion by adjustment of these levers in accordance with the diameter of the work, the type of material, cutting tool and other determinant factors. After the spindle speed and carriage feed are thus selected for the cutting operation, the electrical system permits the headstock motor to be stopped or reversed and the carriage to be traversed electrically at the carriage without disturbing the headstock or feed box speed change levers, thus making it unnecessary for the operator to leave the carriage to start, reverse or stop the spindle or to traverse the carriage rapidly.

The present invention relates specifically to an electric feed unit having a series of conductor rails, the unit being mounted upon and substantially coextensive with the lathe bed, with the rails in electrical connection with a headstock and carriage control switches mounted upon the carriage. The control switches are in electrical connection with the feed rails by means of a collector or trolley unit connected to and movable with the carriage relative to the rails to maintain electrical contact between the switches and rails in spite of carriage movements. For rapid traverse of the carriage there is provided a reversible traverse motor mounted upon the carriage and controlled by one of the switches to permit the carriage to be traversed rapidly in either direction independently of its mechanical feed rod and lead screw drive. The carriage rapid traverse switch is interconnected with the mechanical carriage control levers in such manner that one driving system is rendered inoperative when the other is in operation. For regulating the headstock motor, certain of the feed rails are interconnected with the components of a motor control box mounted adjacent the motor and these rails are in contact with the headstock switch on the carriage. The arrangement is such that the motor control circuit extends from the control box through certain of the rails to the contacts of the switch and from the switch through other rails back to the control box to operate the components of the control box in response to movements of the switch. These components in turn control the main power circuit to the motor.

A primary object of the invention has been to provide a feed rail structure incorporating a protective housing in combination with a collector or trolley connected to the carriage whereby the electrical feed rails are enclosed to prevent electrical interference by cuttings, chips, and coolant and also to prevent injury by contact with the charged electrical parts by the operator or other persons who may attempt to reach into the feed rail unit.

The feed rails are enclosed within an inner or primary housing with a trolley unit tracked within the primary housing and in slidable contact with the feed rails with cables leading from the trolley to the carriage switches. An outer or secondary housing surrounds the inner housing to prevent contact with the feed rails and to provide protection against moisture and chips, and the trolley is connected mechanically to the carriage by means of a cable chute which extends from the carriage through a narrow slot formed lengthwise in the outer housing. Electrical cables extend from the carriage switches through the cable chute to the trolley unit, the chute being arranged to enclose the electrical cables and to protect them from water and chips. The inner or primary housing is generally of inverted U shape in cross section with the feed rails exposed at the lower or open side, the trolley being pressed upwardly against the rails by means of rollers tracked upon flanges formed at the lower edges of the housing. Thus, the trolley is self supporting, and the cable chute serves only to translate it in response to carriage movements. This arrangement permits the cable chute to be made in the form of a narrow flattened tube having just sufficient thickness for the cables, and the slot in the outer housing may be made correspondingly narrow. This slot is formed in the side wall of the outer housing and a drainage flange overhangs the slot to prevent entry of water. The outer housing is spaced from the inner one and encloses it completely with the exception of the slot, but the relationship of the two housings provides a tortuous passageway for the cable chute and its connecting parts which makes it virtually impossible to contact the charged feed rails from outside the housing through the slot.

Further objects and advantages of the invention are more fully disclosed in the specification with reference to the accompanying drawings.

Figure 1:
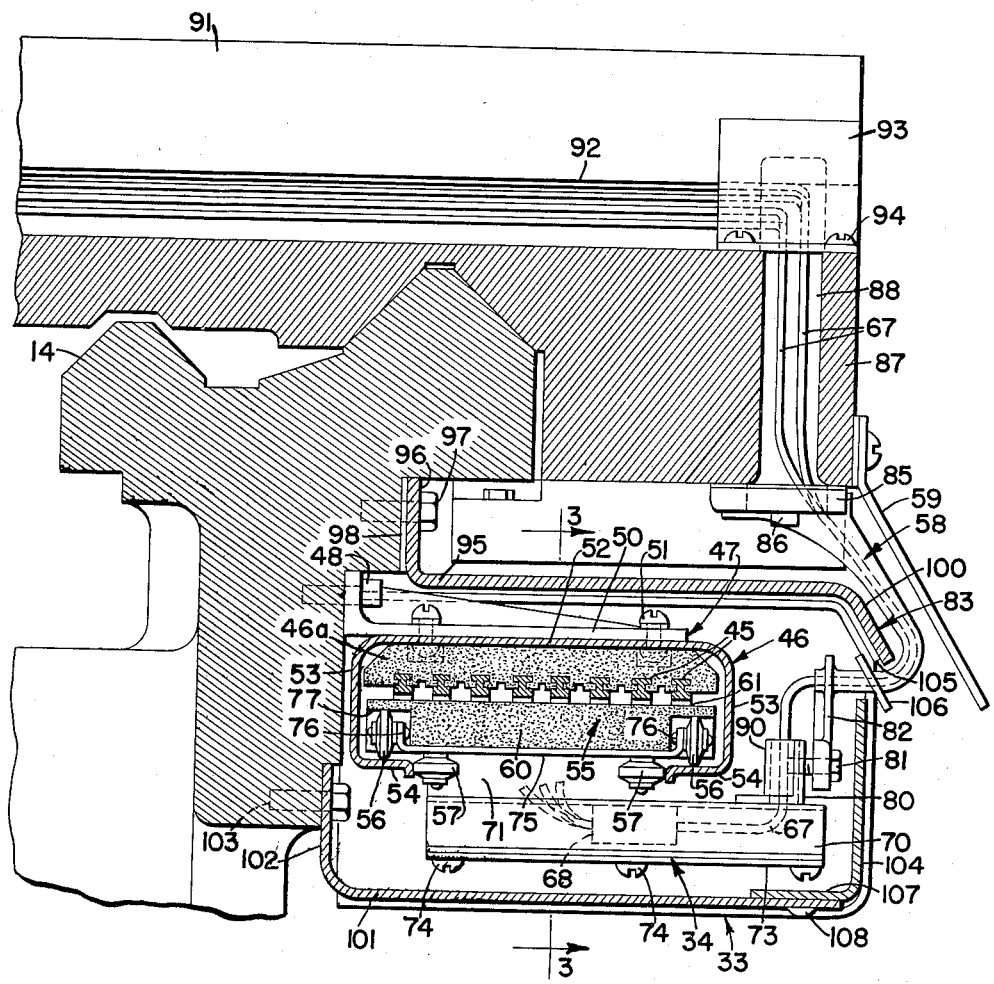
Figure 1 is an enlarged fragmentary sectional view of a portion of a lathe bed and carriage, illustrating the structural details of the feed rail assembly and a portion of the carriage with which it is associated.

3—3, Figure 1, detailing a portion of the trolley with one of its contact shoes.

Figure 2:
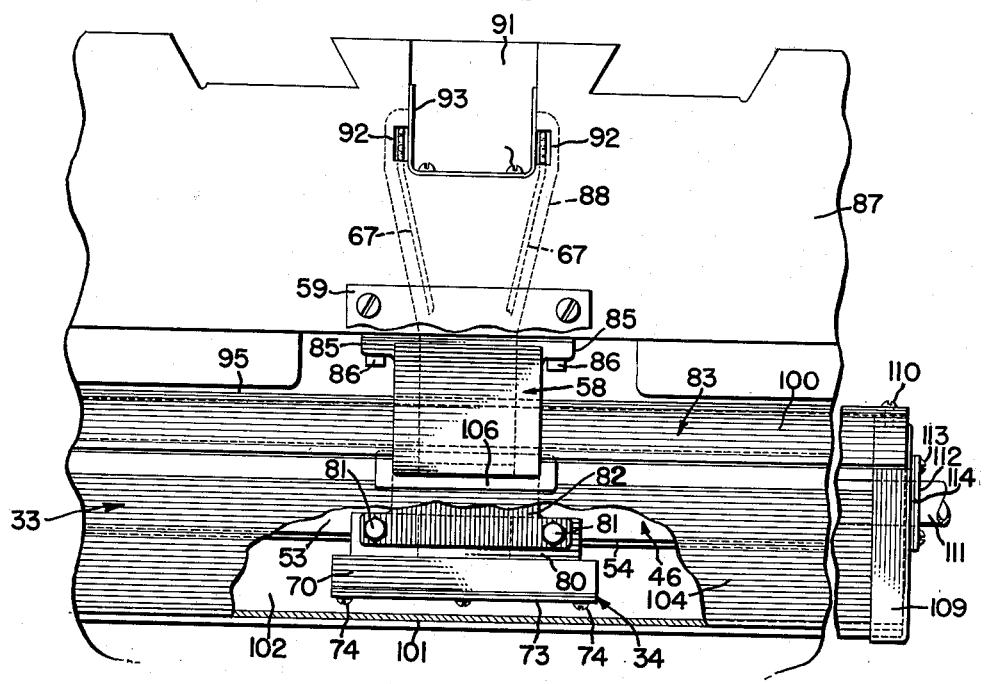
Figure 2 is an enlarged fragmentary rear elevation of the carriage partially broken away to illustrate further the feed rail assembly and its trolley.

Described generally with reference to Figures 1 and 2, the feed rail assembly, which is indicated generally at 33, includes a series of feed rails or bus bars 45 which are in electrical connection with a suitable source of supply by means of a cable (not shown) having individual conductors, one for each bus bar. The bus bars are mounted within an inner housing 46 which is substantially coextensive with the lathe bed, the housing being secured to the bed by a series of L-shaped brackets 47 secured by screws 48 to the bed beneath the overhanging ways 14. The housing 46 is secured upon the horizontal limbs 50 of the brackets by means of screws 51 passing through the limbs into engagement with the top wall 52 of the casing. The inner housing is generally U-shaped in cross section with its open face down and the lower edges of its side walls 53—53 are provided with inwardly turned flanges 54—54 which provide a tracking surface for the trolley 55. The trolley assembly is tracked upon these flanges by rollers 56 which are arranged in pairs at opposite sides and is guided laterally by a second set of rollers 57 also arranged in pairs at opposite sides of the trolley with their axes at right angles to the first set so as to track against the inner edges of the flanges 54—54. The trolley is connected to the carriage by means of a cable chute indicated generally at 58 for unitary translation of the trolley with the carriage relative to the feed rails. A drain plate 59 is secured by screws to the carriage and is inclined downwardly over the cable chute to carry off any coolant which may drain from the carriage.

Figure 3:
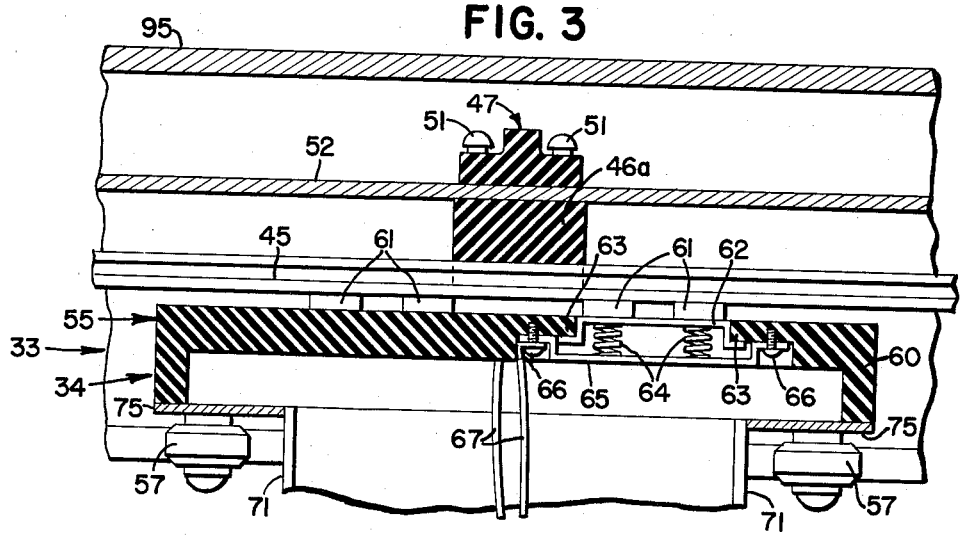
Figure 3 is an enlarged sectional view taken on line

As detailed in Figure 3, the trolley or collector 34 constitutes a block 60 formed of insulating material and provided with a series of spring loaded contact shoes 61 mounted upon its upper face and in bearing engagement with the lower surface of the respective bus bars or feed rail 45 providing a sliding electrical connection between the shoes and the feed rails. The contact shoes 61 are mounted upon U-shaped clips 62 which are formed from sheet metal and which are nested in respective openings formed in the insulating block 60 and the clips are provided with end extensions 63 which engage a shoulder formed in the opening of the block to limit the upward movement of the clips. A pair of springs 64—64 is mounted in compression between the clips 62 and a mounting bracket 65 which is secured to the underside of the block by screws 66—66. The mounting bracket 65 completes the electrical circuit from the contact shoes 61 to the carriage mounted switches (not shown) by cables 67. These cables are connected to the respective brackets 65 by the mounting screws 66. An individual cable 67 thus is electrically connected to each of the contact shoes 61 and the cables extend to an insulated terminal block 68 mounted in a sheet metal cable housing 70 secured to the bottom of the trolley.

The cable housing 70 is provided with a vertical extension 71 which projects upwardly into connection with the bottom of the trolley assembly. Housing 70 also is provided with a bottom cover plate 73 which is secured to the lower edge of the housing by a series of screws 74 to provide a waterproof enclosure for the cables 67. The vertical extension 71 preferably is welded at its lower edge directly to the top wall of the housing 70 and the upper end of extension 71 is welded to a plate 75 which is secured to the bottom of the insulating block 60 (Figure 3) preferably by means of screws not shown. The opposite side edges of plate 75 are up-turned to provide vertical flanges 76—76 (Figure 1) and the rollers 56—56 are secured by rivets to these flanges. The lateral rollers 57 are secured directly to the horizontal portion of the plate in substantially the same manner. The opposite sides of the insulating block 60 are under-cut, as at 77, to provide clearance for the rollers 56. This construction provides a combined driving connection between the carriage and trolley and a protected passageway for the cables 67. As illustrated in Figure 1, the vertical extension 71 is somewhat narrower than the space between the inturned flanges 54—54 so that there is no interference with longitudinal translation of the trolley.

The outer end of housing 70 extends beyond the side of the feed rail housing 53 and includes an angle iron 80 which is engaged by a pair of screws 81 passing through the lower edge of a lug 82 depending from the cable chute 58. The inner housing 46, feed rails 45 and trolley structure 55 so far described follows a conventional design. However, the arrangement taken alone is not satisfactory for lathe usage because the charged feed rails are exposed at the open lower face of the inner housing 46. Thus, cuttings and coolant are likely to come into contact with the feed rails and interfere with the electrical system. A still greater hazard is the likelihood of injury to persons unacquainted with the machine by contact with the feed rails. The outer or protective housing and associated structure hereinafter described substantially encloses the inner housing to prevent contact with the feed rails and isolates the rails, cables and associated parts from liquids, chips and dirt to insure proper operation of the electrical system. The cable chute or enclosure 58 is tubular to provide a passageway for the cables 67 and the lower portion of the chute is flattened and bent in the form of a gooseneck to pass through a relatively narrow slot formed in the protective or outer housing generally indicated at 83, as hereinafter described in detail. The upper end of the chute 58 includes flanges 85—85 secured to the underside of an overhanging portion of the lathe carriage saddle by screws 86—86 and the saddle 87 is provided with a vertical passageway 88 opening into the chute so that the cables 67 may pass from terminal block 68 into the lower end of chute 58, through the chute directly into the passageway 88 of the saddle. The top of housing 70 includes a vertical collar 90 which extends upwardly toward the lower end of the chute to enclose partially the cables passing from the housing to the end of the chute. The chute is formed preferably from sheet metal and is of elongated rectangular shape in cross section, the lower end of the chute being sufficiently narrow to traverse freely the slot formed in the protective housing 83.

The upper portion of the carriage saddle is slotted as at 91 to accommodate the cross feed screw in the usual manner and a pair of slots 92—92 are formed in the opposite side walls of the slot 91 to provide a passageway for the cables 67 from the vertical passageway 88 to the forward side of the carriage. These cables extend to the contacts of the respective carriage and headstock control switches of the carriage. A U-shaped clip 93 is secured by screws 94 in the cross slot 91 at the juncture of the slots 92 with the vertical passageway 88 to hold the cables in position.

As above noted, the charged feed rails are isolated to prevent injury; also to prevent contact with the cuttings which sometimes spiral and twist from the cutting tool and from coolant which splashes about during the cutting operation.

Described in detail with reference to Figure 1, the outer or protective housing 83 is made up of an upper section and a lower section. The upper section constitutes a chip guard 95 which is secured to the bed directly beneath the overhanging guide way 14 and extending for the length of the feed rail assembly. The chip guard is provided with a vertical flange 96 which is secured to the bed by means of screws 97. A water-proof gasket 98 is placed between flange 96 and the surface of the bed to provide a water-tight seal. The guard 95 is fabricated from relatively heavy sheet steel for stiffness and its outer end extends well beyond the feed rail assembly and is provided with a downward inclined run-off flange 100 causing coolant or water to overrun and drain beyond the lower section of the enclosure.

The lower section of the protective housing is in the form of a trough which consists of a bottom plate 101 having its inner side wall 102 secured by screws 103 to the bed of the lathe. To the outer edge of plate 101 is secured a side wall 104 which terminates slightly below the edge of the run-off flange 100 to provide a narrow clearance slot 105 for the cable chute 58. At its point of entry with respect to the slot, the cable chute is provided at the slot with an angulated drip plate 106 which is arranged to underlie the flange 100 with its lower edge overlapping the upper edge of wall 104. Thus, any liquid which may drip from the flange 100 to the chute and which would tend to follow the chute into the enclosure, is intercepted and drained by the drip plate 106. The vertical wall 104 is secured to the bottom plate 101 by a horizontal flange 107 which overlies the bottom plate and which is secured thereto by the screws 108.

It will be observed, as viewed in Figure 1, that the bottom plate 101 of the outer housing 83 encloses the feed rails which are exposed by the open face of feed rail housing 46 and is spaced from housing 46 sufficiently to provide clearance for traversing the cable housing 70. The side wall 104 also is spaced from the side of housing 46 to provide clearance for the laterally extended end of the cable housing and the end of the cable chute which extends through the slot 105. The outwardly spaced bottom plate 101 and side wall 104 of the external housing provides a longitudinal passageway between the feed rail housing and external housing which is generally right angular in cross section. This provides a horizontal passageway portion accommodating the cable housing 70 which projects horizontally and laterally beyond the outer vertical side wall 53 of the feed rail housing. The vertical passageway portion accommodates the lug 82 which projects from the lower end portion of the cable chute downwardly through the vertical passageway portion to the cable housing 70. The relatively narrow slot is disposed above the downwardly exposed feed rails 45 so that it is virtually impossible to contact the feed rails from the exterior of the protective housing. The feed rails are of course insulated from the inner housing 46 by the mounting blocks, indicated at 46a in Figure 1, so that the inner housing 46 can be contacted safely.

The spaced relationship of the inner and outer housings thus provides a tortuous passageway coextensive with the assembly communicating with the slot and complementary to the cable housing and inner end of the cable chute for longitudinal translation of the trolley.

Since the trolley assembly is supported by the inner housing 46 upon rollers, the cable chute serves only to translate the trolley and is relieved of the trolley weight load and pressure exerted by the contact blocks against the feed rails. In other words, the weight load of the trolley and the downward pressure of its contacts is resisted directly by the flanges of the feed rail housing, since the trolley rollers track directly upon the flanges. The self-supporting trolley thus provides reliable electrical contact with the feed rails on one hand, and on the other hand, relieves the cable chute of trolley weight load and its downward contact pressure. Moreover, the self-supporting trolley makes practical the use of the relatively thin cable chute, slot and angular connecting arrangement between the trolley and chute in cooperation with the tortuous passageway.

As shown in Figure 2, the opposite ends of the outer housing 83 are provided with end plates 109 which are secured by screws 110. The cable which passes into the end of the housing may be protected by a metal conduit 111, as shown in Figure 2, and the point of entry of the conduit through the end plate preferably is provided with a flange 112 secured by screws 113 to the cable, there being provided a sealing gasket 114 between the flange 112 and the cable to prevent the entry of moisture.

Having described my invention, I claim:

1. An electrical feed rail structure for a metal turning lathe wherein a carriage having a traverse motor thereon moves on a longitudinal bed, comprising an elongated feed rail housing, said housing having vertical side walls and an open bottom facing downwardly, said open bottom delineated by a pair of inwardly turned, longitudinal flanges residing in a horizontal plane along opposite sides of and for the full length of the housing, a longitudinally movable trolley disposed in the housing and supported upon said flanges, electrical feed rails secured to and extending longitudinally within said housing above the trolley, the trolley having spring-pressed, contact shoes engaged under pressure against the feed rails, an external protective housing extending longitudinally and substantially enclosing the feed rail housing, the external housing having one of its vertical side walls spaced outwardly beyond one of the vertical side walls of the feed rail housing and having a horizontal bottom wall spaced downwardly from the bottom flanges of the feed rail housing, said spaced bottom and side walls providing a longitudinal passageway between the housings which is right angular in cross section having vertical and horizontal passageway portions, the outwardly spaced side wall of the external housing having a slot extending longitudinally thereof and located in a plane adjacent the top of the feed rail housing, a tubular cable chute for movement along the passageway, the chute having a lower end portion projecting laterally through said slot into the vertical passageway portion, a cable housing secured to the bottom of the trolley, the cable housing disposed horizontally below the open bottom of the feed rail housing and projecting laterally across the horizontal passageway portion and outwardly beyond the side wall of the feed rail housing, and a vertical lug member extending downwardly from the end portion of the cable chute and through the vertical passageway portion, the lower end of the lug member being attached to the outwardly projecting portion of the cable housing, the trolley being movable by the cable chute and lug member, whereby the trolley is engaged against the feed rails; and electrical terminals in the feed rails and contact shoes.

2. An electrical feed rail structure according to claim 1, in which said outwardly spaced side wall of the external housing includes a downwardly and outwardly inclined drainage flange overhanging the slot; and said structure further comprising a drain plate mounted above said external housing and extending downwardly in parallelism with said drainage flange and overlying the cable chute and slot.

References Cited in the file of this patent

UNITED STATES PATENTS

| | | |
|---|---|---|
| 448,461 | Stewart | Mar. 17, 1891 |
| 455,447 | Bradley | July 7, 1891 |
| 1,429,025 | Dunbar et al. | Sept. 12, 1922 |
| 1,466,893 | Dunbar | Sept. 4, 1923 |
| 1,477,186 | Randolph | Dec. 11, 1923 |
| 1,761,748 | Runner | June 3, 1930 |
| 1,901,977 | McArdle | Mar. 21, 1933 |
| 1,968,255 | Lewis | July 31, 1934 |
| 2,106,858 | Snyder | Feb. 1, 1938 |
| 2,117,480 | Harvey | May 17, 1938 |
| 2,171,271 | Johnson | Aug. 29, 1939 |
| 2,304,924 | Jackson et al. | Dec. 15, 1942 |
| 2,320,896 | Snyder | June 1, 1943 |
| 2,354,372 | Groene | July 25, 1944 |
| 2,412,382 | Anderson | Dec. 10, 1946 |
| 2,562,979 | Yingling | Aug. 7, 1951 |
| 2,568,480 | Barkis | Sept. 18, 1951 |

FOREIGN PATENTS

| | | |
|---|---|---|
| 633,243 | Great Britain | Dec. 12, 1949 |